US 6,654,207 B2

(12) United States Patent
Hong et al.

(10) Patent No.: US 6,654,207 B2
(45) Date of Patent: Nov. 25, 2003

(54) SELF-POSITIONING MAGNETIC LATCH

(75) Inventors: Yiren Hong, Singapore (SG); Tak Koon Qoi, Singapore (SG); Chor Shan Cheng, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 77 days.

(21) Appl. No.: 09/966,385

(22) Filed: Sep. 28, 2001

(65) Prior Publication Data

US 2002/0075604 A1 Jun. 20, 2002

Related U.S. Application Data

(60) Provisional application No. 60/257,059, filed on Dec. 20, 2000.

(51) Int. Cl.⁷ .............................. G11B 5/54; G11B 5/55; G11B 21/22
(52) U.S. Cl. ................. 360/256.2; 360/264.8; 360/266.7
(58) Field of Search ........................... 360/256.2, 264.8, 360/266.7

(56) References Cited

U.S. PATENT DOCUMENTS

| 5,025,335 | A | | 6/1991 | Stefansky | |
|---|---|---|---|---|---|
| 5,034,837 | A | * | 7/1991 | Schmitz | 360/256.2 |
| 5,270,887 | A | | 12/1993 | Edwards et al. | |
| 5,369,538 | A | | 11/1994 | Moe et al. | |
| 5,452,159 | A | * | 9/1995 | Stefansky | 360/256.2 |
| 5,568,333 | A | | 10/1996 | Bang | |
| 5,581,422 | A | | 12/1996 | Umehara | |
| 5,729,405 | A | | 3/1998 | Isomura et al. | |
| 5,822,156 | A | | 10/1998 | Suzuki et al. | |
| 5,956,213 | A | * | 9/1999 | Dague et al. | 360/256.2 |
| 6,091,579 | A | | 7/2000 | Suzuki | |
| 6,252,744 | B1 | | 6/2001 | Kelemen | |
| 6,445,548 | B1 | * | 9/2002 | Sasaki et al. | 360/256.2 |

FOREIGN PATENT DOCUMENTS

| EP | 0 576 839 A2 | | 5/1994 | | |
|---|---|---|---|---|---|
| GB | 2342762 A | * | 4/2000 | | G11B/5/54 |
| JP | 04067477 A | * | 3/1992 | | G11B/21/02 |
| JP | 04358366 A | * | 12/1992 | | G11B/21/02 |
| JP | 06139722 A | * | 5/1994 | | G11B/21/02 |
| JP | 11039810 A | * | 2/1999 | | G11B/21/02 |
| WO | WO 9505658 A1 | * | 2/1995 | | G11B/5/54 |

* cited by examiner

Primary Examiner—William Klimowicz
(74) Attorney, Agent, or Firm—Derek J. Berger

(57) ABSTRACT

Disclosed is a magnetic latch for a disc drive. Upper and lower voice coil magnet pole pieces include extensions which bend toward one another, defining a gap therebetween. The gap creates a magnetic field which attracts and holds a disc drive actuator in a park position when the drive is not in use.

18 Claims, 4 Drawing Sheets

SELF-POSITIONING MAGNETIC LATCH

CROSS-REFERENCE TO RELATED APPLICATIONS

This application claims the benefit of United States Provisional Application No. 60/257,059, filed Dec. 20, 2000.

FIELD OF THE INVENTION

This invention relates generally to the field of hard disc drive data storage devices, and more particularly, but not by way of limitation, to magnetic latches for holding disc drive actuators in their park position.

BACKGROUND OF THE INVENTION

Disc drives of the type known as "Winchester" disc drives, or hard disc drives, are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 15,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by flexures attached to the actuator.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator bearing housing is mounted to the pivot shaft by an arrangement of precision ball bearing assemblies, and supports a flat coil which is suspended in the magnetic field of an array of permanent magnets, which are fixedly mounted to the disc drive housing base member. These magnets are typically mounted to plates, also known as pole pieces or simply poles, which are mounted in positions vertically spaced from one another.

On the side of the actuator bearing housing opposite to the coil, the actuator assembly typically includes a plurality of vertically aligned, radially extending actuator head mounting arms, to which the head suspensions mentioned above are mounted. These actuator arms extend between the discs, where they support the head assemblies at their desired positions adjacent the disc surfaces. The drive further includes a voice coil motor (VCM) which operates in the following manner. When controlled DC current is applied to the coil, a magnetic field is formed surrounding the coil which interacts with the magnetic field of the permanent magnets to rotate the actuator bearing housing, with the attached head suspensions and head assemblies, in accordance with the well-known Lorentz relationship. As the actuator bearing housing rotates, the heads are moved generally radially across the data tracks of the discs along an arcuate path.

When power to the disc drive is lost or when the disc drive is not in operation, some method for restraining the rotation of the actuator arms must be used so as to avoid damage to the disc surfaces or to the heads. One known restraint method is to move the heads to a parking zone and to latch the actuator in that position until power is restored to the disc drive. This parking zone is typically located at an inner diameter of the disc or just outside the outer diameter of the disc. In the latter case, the head may be moved off of and onto the disc by means of a ramp.

One conventional latching system involves a first, magnetically permeable latch member that is fixed relative to the base of the disc drive housing and a second, magnetically permeable latch member that is attached to the yoke of the actuator. The second latch member is thus capable of traveling in a substantially horizontal arcuate path about the pivot shaft. The first latch member is generally vertical and located near the permanent magnet of the voice coil magnet assembly so that it is capable of holding the second latch member by magnetic attraction when the disc drive is not in operation. The first latch member also forms part of the VCM magnet assembly in that it is fixed between the upper and lower poles of the VCM. The permanent magnet is usually connected to the lower pole which is in turn mounted to the base of the disc drive housing.

The conventional method of assembling the first latch member involves first mounting the lower plate to the base of the disc drive housing. The lower plate includes a hole into which an end portion of the first latch member is inserted. After mounting the actuator to the base of the disc drive housing, the upper pole is installed. The upper pole also includes a hole which serves to locate the upper end of the first latch member and to secure it in place.

There are many problems associated with this conventional magnetic latch structure. One problem is that an extra part is required, namely the first latch member. This additional part is costly. Moreover, installation of this latch requires a number of assembly steps. Tolerances between the latch and the poles must be must be very close in order to accurately park the actuator, requiring precise manufacturing and assembly methods. All of these factors require additional time and expense.

What the prior art has been lacking is a latch structure which is simple in construction, inexpensive and easily manufactured and assembled while still providing precise positioning of a parked actuator.

SUMMARY OF THE INVENTION

Disclosed is a magnetic latch assembly. In a preferred embodiment, upper and lower poles are each provided with protruding portions which bend to extend vertically toward each other. The two bent portions together form a vertical magnetic latch member configured to attract a magnetically permeable element located on an actuator. Each bent portion may have a locating feature for accurately positioning the bent portions relative to one another.

Additional features and benefits will become apparent upon a review of the attached figures and the accompanying description.

DETAILED DESCRIPTION OF THE INVENTION

Figure 1:
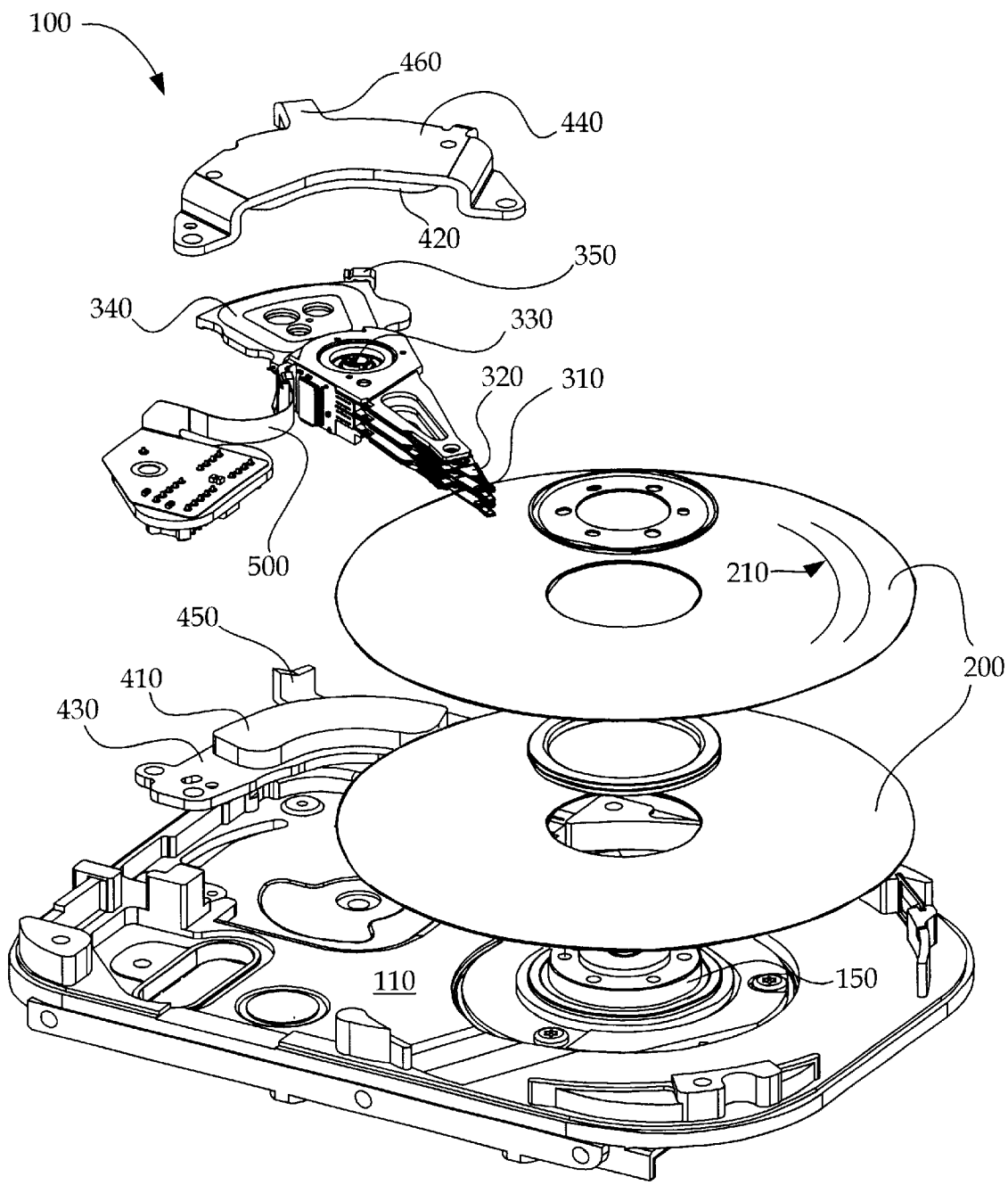
FIG. 1 shows an exploded view of a disc drive incorporating the magnetic latch of the present invention.

Turning now to the drawings and specifically to FIG. 1, shown is an exploded view of an example of a disc drive 100 in which the present invention is particularly useful. The disc drive 100 includes a deck 110 to which all other components are directly or indirectly mounted and a top cover (not shown) which, together with the deck 110, forms a disc drive housing which encloses delicate internal components and isolates these components from external contaminants.

The disc drive 100 includes a plurality of discs 200 which are mounted for rotation on a spindle motor 150. The discs 200 include on their surfaces a plurality of circular, concentric data tracks 210 on which data are recorded via an array of vertically aligned head assemblies 310. The head assemblies 310 are supported by flexures 320, which are attached to arm portions of actuator 300. The actuator 300 is mounted for rotation about a pivot shaft 330.

Power to drive the actuator 300 about the pivot shaft 330 is provided by a voice coil motor (VCM). The VCM consists of a coil 340 which is supported by the actuator 300 within the magnetic field of a permanent magnet assembly 400 having a lower magnet 410 and an upper magnet 420. The lower magnet 410 is mounted to a lower pole piece 430 which is fixed to the deck 110, and the upper magnet 420 is supported above the lower magnet 410 by an upper pole piece 440. The upper pole piece 440 is supported above lower pole piece 430 by vertical portions. The actuator 300 includes a magnetically permeable latch element 350 mounted thereon, and the magnet assembly 400 includes a magnetic latch element 450, 460. In the illustrated embodiment, when drive operation ceases the VCM drives the actuator so that the heads are located at inner diameters of their respective discs to parking zones. In this position, the actuator latch element 350 is held against magnetic latch 450, 460 until the drive is operable again and the VCM rotates the actuator so the actuator latch element 350 is no longer in contact with the magnetic latch 450, 460.

Electronic circuitry to control all aspects of the operation of the disc drive 100 is also provided. VCM control signals and data signals which travel to and from the heads 310 are carried between the electronic circuitry and the moving actuator 300 via a flexible printed circuit cable (PCC) 500.

Figure 2:
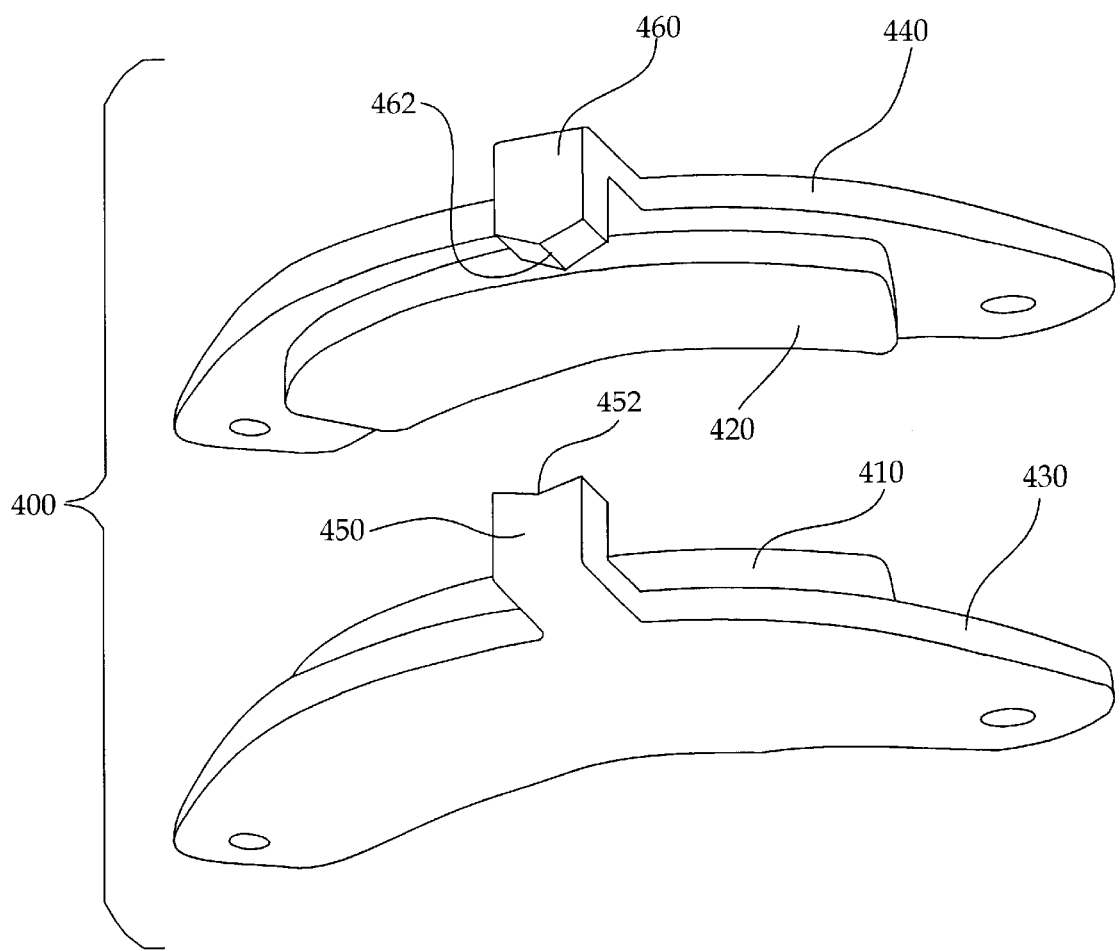
FIG. 2 shows an exploded view of a magnet assembly including a magnetic latch.

The voice coil magnet assembly 400 is shown in exploded view in FIG. 2. As can clearly be seen here, lower and upper poles 430, 440 are provided and lower and upper magnets 420, 410 are attached to the poles by conventional methods such as adhesive.

In a preferred embodiment, both the upper and lower poles 430, 440 are formed by stamping. Stamping is preferred because it is fast, inexpensive, and produces virtually identical parts even after repeated operations. FIG. 2 also shows lower pole 430 to have an upwardly bent portion 450 which terminates in a "V"-shaped element 452. Upper pole 440 includes a corresponding downwardly bent portion 460 which terminates at a point 462. The purpose and functioning of the bent portions 450, 460 will be explained below. The poles 430, 440 may be assembled in any number of ways. For example, FIG. 1 shows upper pole 440 to have downwardly extending end portions which may then be fastened to lower pole 430. However, other means may be used to space these elements, such as separate spacer elements which connect to and extend between upper and lower poles 440, 430. The actuator 300 is typically installed in the deck 110 prior to installing the upper pole 440, although it is contemplated that other assembly methods may also be used.

Figure 3:
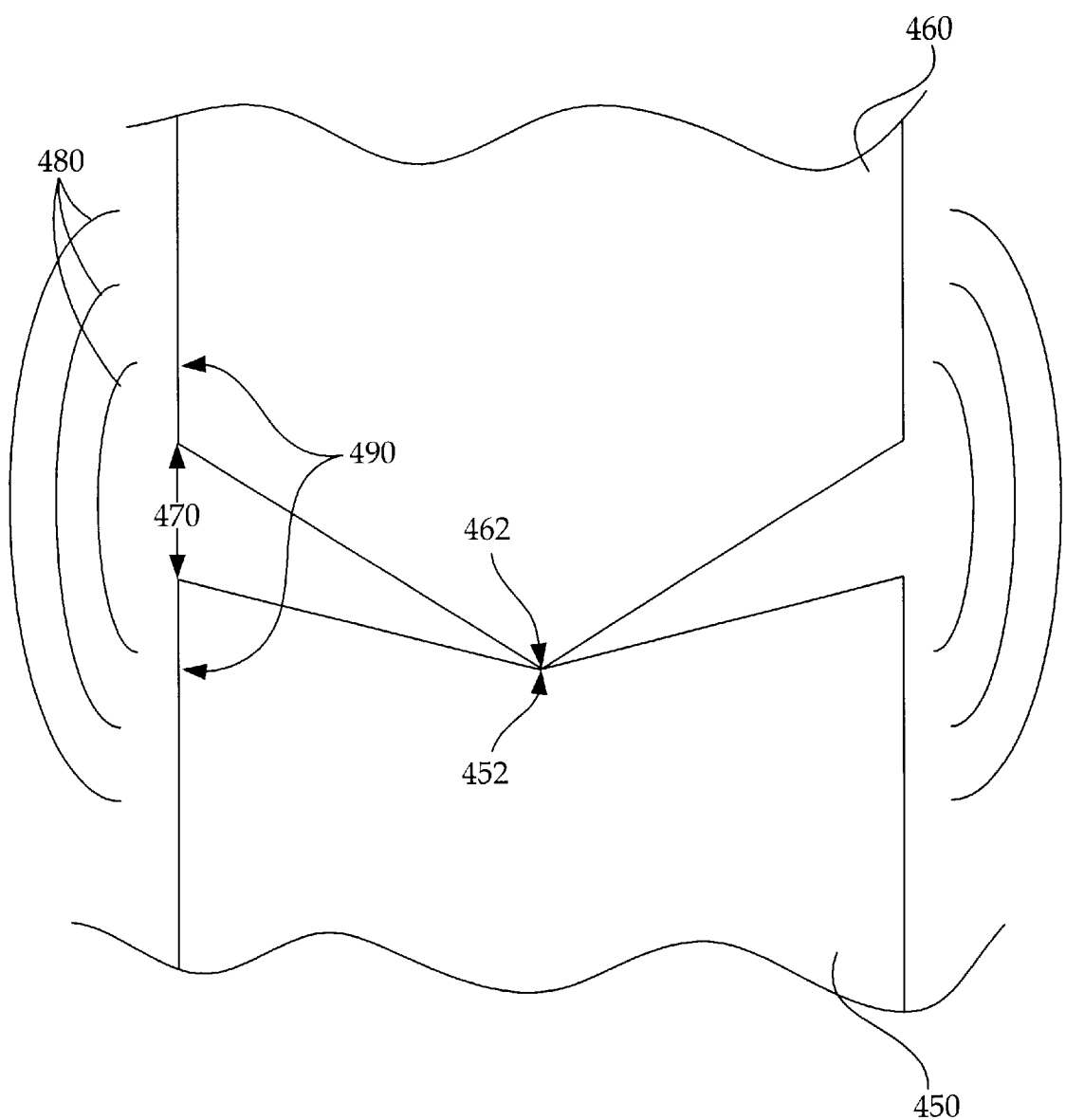
FIG. 3 shows bent portions of a fully assembled magnetic latch.
Figure 4:
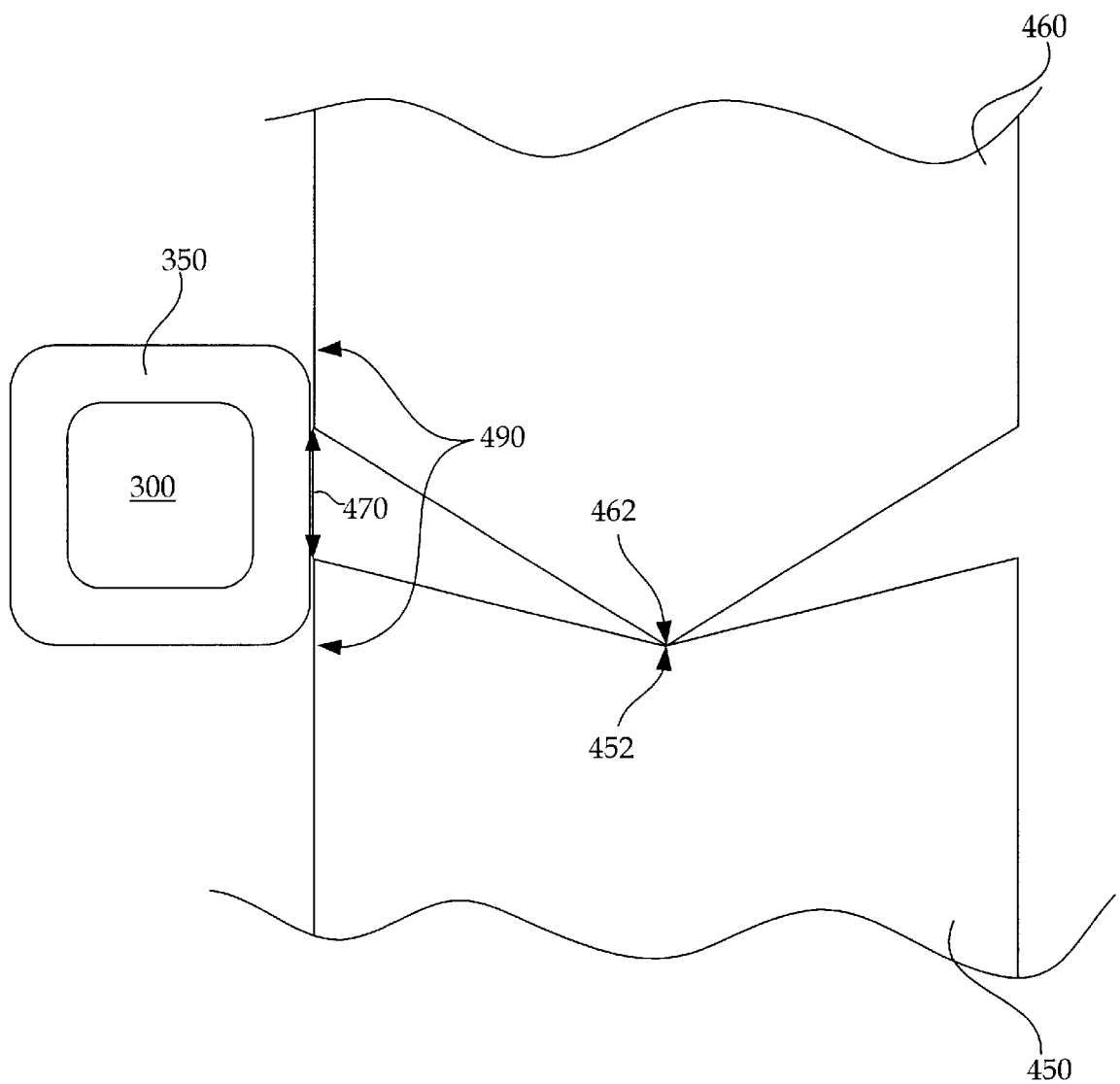
FIG. 4 shows a magnetic latch engaged with an actuator latch element with the actuator in the park position.

FIG. 3 shows bent portions 450, 460 after the magnet assembly 400 has been fully assembled. A gap 470 extends between the ends of bent portions 450, 460. Curved lines 480 represent paths of magnetic flux which generate a magnetic field which extends outwardly from the edges of the bent portions 450, 460. When the drive 100 is powered down, the actuator moves toward its park position. As shown in FIG. 4, once the actuator latch element 350 reaches the magnetic field, it is magnetically attracted into contact with the sides 490 of the bent portions 450, 460, at which point the heads 310 are located at their park position over the inner diameters of their respective discs 200.

The gap 470 controls the size and the intensity of the magnetic field. If the gap is too small, the resulting magnetic field may be too weak to pull the actuator in to the park position, especially if the drive is subject to shock before the actuator latch element 350 reaches the latch surface 490. If the gap is too large, the resulting magnetic field may be too strong, causing undue delay in allowing the actuator to move when the drive is restarted. In extreme cases, it may even be impossible to move the actuator out of the park position upon drive restart. As discussed above, upper and lower poles 440, 430 are preferably formed by stamping. One problem with stamping, however, is that tolerances are more difficult to control during stamping operations than during precision machining operations. More specifically, while shapes that are stamped out of a blank can be controlled fairly closely, portions which are stamped and then bent out of a blank are particularly difficult to control with precision. It should be evident that stamping raises the risk that the size of gap 470 will be other than optimal if measures are not taken to ensure that gap sizes are uniform throughout production of stamped poles 430, 440.

In one embodiment of the present invention, the bent latch portions 450, 460 are provided with a "V"-shaped portion and a protrusion. The protrusion terminates at a point 462 while the "V"-shaped portion includes a notch 452 into which the point 462 extends when the magnet assembly 400 is fully assembled. As explained above, edges and corners which are stamped directly out of a blank, such as the point 462 and the angled corner between the protrusion and edge 490 are easily controlled. However, the extent to which portions 450 and 460 are bent upwardly and downwardly, respectively, is more difficult to control. As a result, it is possible that the ends of one or both bent portions 450, 460 may extend above or below a desired vertical position. It is also possible that one or both bent portions 450, 460 may twist slightly during the stamping operation, resulting in a slight lateral displacement of the ends of the bent portions 450, 460.

This difficulty in locating edges 490 of upper and lower bent portions 460, 450 is overcome by this embodiment of the invention, by the provision of notch 452 and point 462. When top pole 440 is installed over bottom pole 430, the upper bent portion 460 is pressed downwardly until point 462 engages the lowermost point of notch 452. It should be clear that if point 462 and notch 452 are slightly misaligned prior to assembly, that point 462 will slide along a sloped portion of notch 452 until it comes into engagement with the lowermost point of the notch 452. Similarly, if the position of either the notch 452 or the point 462 are initially distorted so as to be vertically mispositioned, pressure on the upper pole 440 will urge the bent portions together until point 462 comes into contact with the lowermost point of notch 452.

Once positioned, the upper pole 440 is secured in position over lower pole 430 and the size and alignment of gap 470 is assured, so the magnetic field created by the magnetic latch 450, 460 can be reliably created. It should be clear that the latch described herein provides many advantages over prior art devices. Stamping the latch elements 450, 460 in the same operation along with the pole pieces removes the need for additional parts as well as additional manufacturing and assembly steps. At the same time, the aligning features 452, 462 allow the gap 470 to be formed with a great degree of precision so that latch forces can be easily reproduced.

It should of course be understood that variations may be made to the disclosed device without departing from the spirit of the claimed invention. For example, protruding point 462 may of course be located on the lower pole 450 and the notch located on the upper pole 460.

Alternately characterized, a first contemplated embodiment of the invention takes the form of a disc drive (such as 100) including an actuator (such as 300) adapted to rotate into and out of a park position. The drive 100 also includes a voice coil magnet assembly 400 for effecting movement of the actuator 300. The magnet assembly 400 includes a first pole piece (such as 430) and a second pole piece (such as 440) which is parallel to and vertically spaced from the first pole piece 430. The drive 100 further includes a latch for holding the actuator in the park position. The latch includes a first latch element (such as 450) extending from and unitarily formed with the first pole piece 430 and a second latch element (such as 460) extending from and unitarily formed with the second pole piece 440, and a gap (such as 470) is defined therebetween which causes the actuator 300 to be held in the park position. The first and second latch elements 450, 460 may be in contact with one another. The first latch member 450 may include two sloped surfaces and a point (such as 452) defined by an intersection of the two sloped surfaces, the second latch member 460 being configured so as to contact the point 452 when the magnet assembly 400 is fully assembled in the drive 100. The first pole piece 430 and the first latch member 450 may be formed during a single stamping operation. As a further option, a third latch member (such as 350) may be mounted to the actuator 300, the third latch member 350 being in contact with the first and second latch members 450, 460 when the actuator 300 is in the park position.

Alternately characterized, a second contemplated embodiment of the invention takes the form of a disc drive (such as 100) including an actuator (such as 300) configured to move into and out of a park position and a latch for holding the actuator 300 in the park position. The latch includes a first stationary latch element (such as 450) and a second stationary latch element (such as 460) extending toward and contacting the first latch element 450 and defining a gap (such as 470) between the first and second latch elements 450, 460, the gap 470 causing the actuator 300 to be held in the park position. Optionally, drive 100 may further include a voice coil magnet assembly (such as 400) for effecting actuator movement. Such a magnet assembly 400 could further includes a first pole piece 430 to which the first latch member 450 is mounted. As a further option, the first latch element 450 may have a notch formed therein, and the second latch element 460 may include a pointed protrusion (such as 462) which fits within and engages the notch. As yet a further option, the first latch member (450) may be formed from sheet material. The actuator 300 may also include a magnetically permeable element (such as 350) which is magnetically attracted to the latch when the actuator 300 is within a predetermined proximity of the park position.

From the foregoing, it is apparent that the present invention is particularly suited to provide the benefits described above. While particular embodiments of the invention have been described herein, modifications to the embodiments which fall within the envisioned scope of the invention may suggest themselves to one of skill in the art who reads this disclosure.

What is claimed is:

1. An apparatus comprising:
   an actuator adapted to move into and out of a park position;
   a voice coil magnet assembly for effecting actuator movement, the assembly comprising:
      a first pole piece; and
      a second pole piece parallel to and vertically spaced from the first pole piece; and
   a latch for holding the actuator in the park position, the latch comprising:
      a first latch element extending from and integral with the first pole piece; and
      a second latch element extending from the second pole piece, the first and second latch elements defining a gap therebetween, the gap causing the actuator to be held in the park position, the first and second latch elements touching one another.

2. The apparatus of claim 1, in which the first latch element includes two sloped surfaces and a point defined by an intersection of the two sloped surfaces, and in which the second latch element is configured so as to contact the point when the magnet assembly is fully assembled in a disc drive.

3. The apparatus of claim 1, in which the first pole piece and the first latch element are capable of being formed during a single stamping operation.

4. The apparatus of claim 1, in which the latch further comprises:
   a third latch element mounted to the actuator, the third latch element touching the first latch element when the actuator is in the park position.

5. The apparatus of claim 1, in which the apparatus further comprises a rotatable disc.

6. The apparatus of claim 1, in which the actuator is rotatable.

7. The apparatus of claim 1, in which the second latch element is integral with the second pole piece.

8. An apparatus, comprising:
   an actuator configured to move into and out of a park position; and
   a latch for holding the actuator in the park position, the latch comprising:
      a first stationary latch element; and
      a second stationary latch element extending toward and touching the first latch element and defining a gap between the first and second latch elements, the gap causing the actuator to be held in the park position.

9. The apparatus of claim 8, further comprising:
   a voice coil magnet assembly for effecting actuator movement, in which the magnet assembly further comprises a first pole piece, the first latch element being mounted to the first pole piece.

10. The apparatus of claim 8, in which the first latch element has a notch formed therein, and in which the second latch element comprises a pointed protrusion which fits within and engages the notch.

11. The apparatus of claim 8, in which the first latch element is formed from sheet material.

12. The apparatus of claim 8, in which the actuator includes a magnetically permeable element which is magnetically attracted to the latch when the actuator is within a predetermined proximity of the park position.

13. The apparatus of claim 8, in which the apparatus further comprises a rotatable disc.

14. The apparatus of claim 8, in which the actuator touches the latch when the actuator is in the park position.

15. A disc drive, comprising:

an actuator configured to rotate into and out of a park position; and means for latching the actuator in the park position, the latching means comprising first and second latching elements touching one another and defining a gap configured to hold the actuator in the park position.

16. The disc drive of claim 15, in which the latching means comprises a magnetically permeable element mounted to the actuator.

17. The disc drive of claim 15, in which the latching means comprises a voice coil magnet assembly.

18. The disc drive of claim 15, in which the first and second latching elements are stationary and generate a magnetic field.

\* \* \* \* \*